United States Patent [19]

Pierce

[11] 4,198,191

[45] Apr. 15, 1980

[54] VAPORIZATION COOLED DIELECTRIC FLUID PUMP

[75] Inventor: Linden W. Pierce, Rome, Ga.

[73] Assignee: General Electric Company

[21] Appl. No.: 894,543

[22] Filed: Apr. 7, 1978

[51] Int. Cl.² ............................................. F04B 39/06
[52] U.S. Cl. ..................................... 417/369; 417/414; 310/54; 310/63
[58] Field of Search ................................ 417/366–369, 417/421, 414; 310/58, 59, 54, 63, 53, 57

[56] References Cited

U.S. PATENT DOCUMENTS

| | | | |
|---|---|---|---|
| 2,321,126 | 6/1943 | Breuer | 417/367 |
| 2,510,632 | 6/1950 | Hemphill | 417/369 X |
| 2,839,006 | 6/1958 | Mayo | 417/367 |
| 3,195,467 | 7/1965 | Collet | 417/420 |
| 3,479,541 | 11/1969 | Robinson | 310/54 |
| 3,497,133 | 2/1970 | Childress et al. | 417/313 |
| 3,572,976 | 3/1971 | Sato | 417/369 |
| 3,790,309 | 2/1974 | Volz | 417/369 X |

FOREIGN PATENT DOCUMENTS

526697  9/1940  United Kingdom ................ 417/902

Primary Examiner—Carlton R. Croyle
Assistant Examiner—Edward Look
Attorney, Agent, or Firm—Francis X. Doyle; Richard A. Menelly

[57] ABSTRACT

The invention is a hermetically sealed motor driven pump cooled by a liquid dielectric coolant. The pump has an impeller housing, a motor housing containing a liquid dielectric cooling fluid of the same type as the pumped fluid, and a sealing means between the impeller housing and the motor housing to prevent flow of the pumped fluid from the impeller housing to the motor housing. An electric motor is contained in the motor housing with a shaft extending into the impeller housing and an impeller attached to the shaft inside the impeller housing. A hollow conduit from the discharge port of the impeller housing to the motor housing is used to create a fluid pressure inside the motor housing equal to the pressure of the pumped fluid at the discharge port to increase the heat dissipation. Particles in the pumped fluid are effectively excluded from contacting the bearings. The hollow conduit may contain a filter or desiccant and the motor housing may contain a magnetic plug.

21 Claims, 7 Drawing Figures

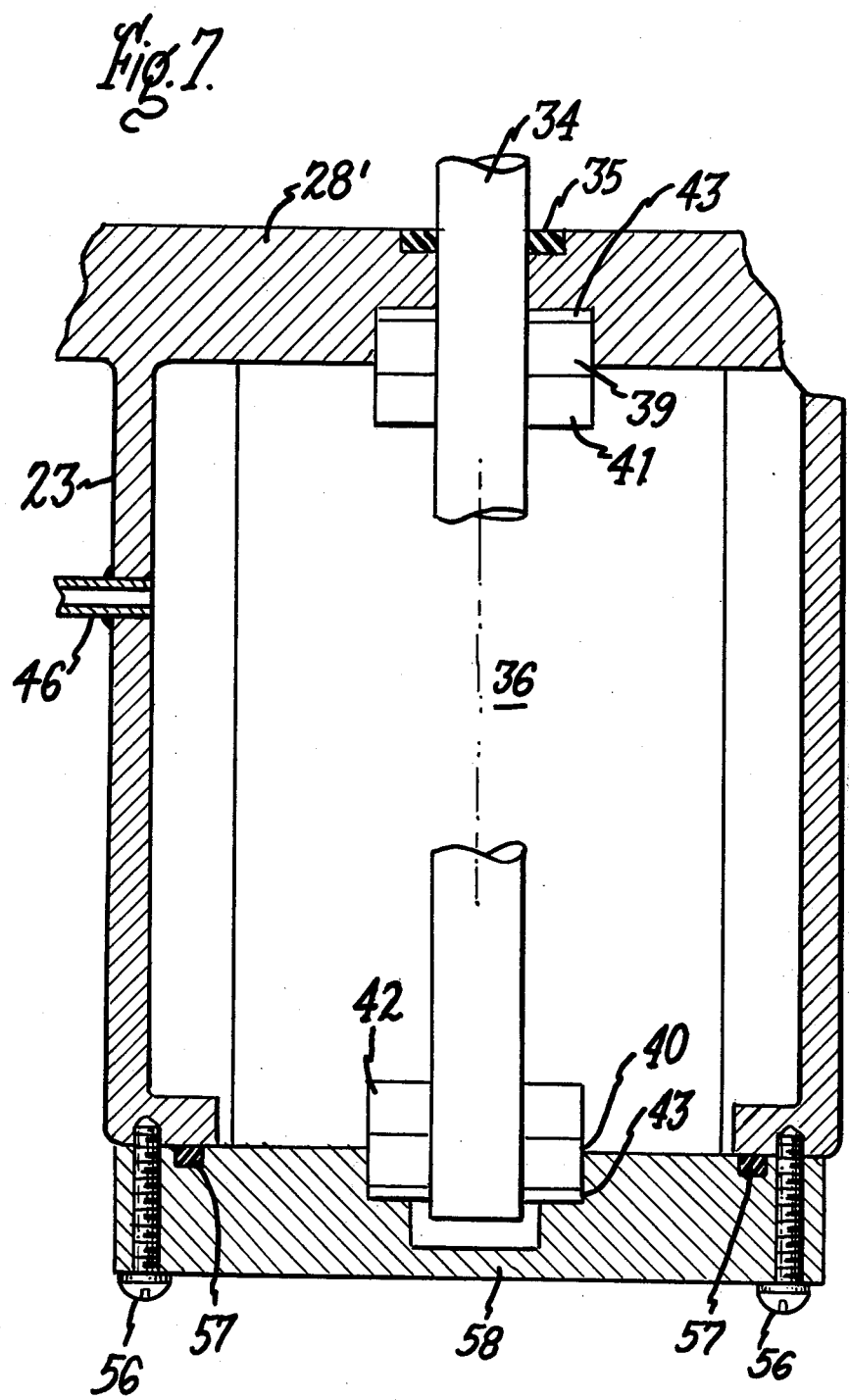

VAPORIZATION COOLED DIELECTRIC FLUID PUMP

BACKGROUND OF THE INVENTION

Vaporization cooled electrical apparatus such as transformers usually utilize a pump as shown in FIG. 1 to spray a vaporizable dielectric fluid 5 upon the electrical windings 6 enclosed in a tank 4 to remove the heat generated through vaporization of the fluid 5. The vapor is condensed by a heat exchanger 7 and the condensate flows to a sump 8 and is recirculated to the windings 6 by the pump 3. Since only small volumes of liquid are required and since the vapor provides dielectric strength, any leaks of fluid can lead to transformer failure or shutdown, due to overheating or reduced dielectric strength. Since vaporizable fluids are used, small leaks are not visible to the eye due to evaporation. Conventional pumps with shaft seals will inherently wear out and leak during the 20 to 40 year expected life of such apparatus. For these reasons, a pump without a shaft seal or stuffing box is desirable.

Large electrical apparatus, such as transformers, utilize welded steel tanks which inherently have small quantities of metallic particles from the manufacturing processes remaining in the tank and piping. In transformers utilizing natural convection of a dielectric grade of mineral oil for cooling, oil velocities are very low so that these particles will not be moved from their resting positions in crevices and tank bottoms. However, in vaporization cooled transformers the fluid velocities are very high and these particles are circulated through the piping. In addition, the spray pattern and solvent action of the fluids used cause small particles of insulation to be dislodged and washed into the circulation system. If these particles enter the pump bearings, excessive wear and possible pump failures can occur which lead to failure or shutdown of the transformer.

One solution to this problem is to use a strainer or filter in the pump suction line. This solution, however, has several disadvantages. In order to remove small particles, a fine mesh filter must be used. This element introduces an additional pressure drop in the suction line which the pump suction pressure must overcome. Since the fluids are very volatile, this additional suction by the pump intake can lower the fluid pressure below the vapor pressure, causing the generation and collapse of vapor bubbles in the fluid known as "cavitation." This reduces the flow rate and leads to wear of the impeller, scroll, and bearings. In addition, the intake filter can become clogged which reduces the pump flow and may lead to overheating of the transformer unless the unit is shut down and the filter changed. The problem is not as detrimental if the strainer is in the discharge line where the pump discharge pressure is several times larger than the suction pressure; however, this allows particles to circulate through the pump prior to entering the strainer.

For the above reasons, it is desirable to provide a pump design in which a suction line strainer is not required and wherein the bearings are not exposed to the particles in the fluid, and wherein seals which wear and allow fluid leakage to the atmosphere are not required.

U.S. Pat. No. 3,138,105 discloses one pump (FIG. 2) which does not require shaft seals. A stainless steel shell 10 is inserted into the annular gap between the motor rotor 11 and the motor stator 12 to seal the stator 12 from the flow of the fluid. Another stainless steel shell 13 is inserted into the gap to completely enclose the rotor 11 and prevent contact of the fluid with the rotor 11. This pump is commonly called a "canned rotor" pump. A portion of the fluid pumped is through circulated by the impeller 14 through a screen assembly 15, holes in the front bearing 16, through the annular gap between the shells 10 and 13 and through holes in the back bearing 17. The fluid returns to the scroll 18 through a hollow shaft 19. The fluid pumped serves to lubricate the bearings 16,17 and cool the motor rotor 11 and stator 12. Heat is also transferred from the stator 12 by air convection from outer shell 20 which is not air tight. The bearings 16,17 are usually made from graphite.

The prior art "canned rotor" pump is especially suitable for pumping corrosive chemicals by preventing contact of the fluid with the rotor 11 and stator 12. However, the prior art "canned rotor" pump was found to be unsuitable for use on vaporization cooled transformers containing small particles in the fluid. The particles in the fluid pass through the clearances between the screen 15 and shaft 19. These particles are forced by the fluid circulation into the bearings 16,17 and into the gap between the stator shell 10 and the rotor shell 13. The particles cause excessive wear of bearings 16,17 and shaft 19 which causes the rotor shell 11 to contact the stator shell 10. Continued operation of the pump causes a hole to wear in the stator shell 10 which allows the fluid to escape, causing electrical failure of the apparatus or shutdown for pump repair. The temperature of the stator 12 is high since the efficiency of air cooling is poor. The stainless steel shells 10,13 in the gap between the rotor 11 and the stator 12 introduces additional thermal impedance to the heat flow of the pumped fluid. The stainless steel shells 10,13 in the magnetic field also increase the amount of electrical losses and cause additional heating. Since the volume of fluid between the rotor shell 13 and the stator shell 10 is small, the fluid can vaporize when volatile fluids are pumped. The fluid vapor enters the scroll 18 and causes loss of flow and overheating of the stator 12. The graphite commonly used for the bearings 16,17 is also a possible contaminant of dielectric fluids.

Other prior art inventions for pumping vaporizable dielectric fluids include vapor push pumps are disclosed in U.S. Pat. Nos. 3,819,301 and 3,834,835. These type pumps require large amounts of electric power to heat the fluid so that the efficiency is low.

It is an object of this invention to provide a pump for conveying vaporizable dielectric fluids containing solid particles by preventing entrance of these particles into the bearings and without rotary shaft seals which may cause leakage of the fluid to the atmosphere.

SUMMARY OF THE INVENTION

This invention provides a sealed centrifugal pump for pumping dielectric liquids within electrical apparatus such as vaporization cooled transformers with the electric motor windings cooled by vaporization of the same type liquid pumped. The motor coolant, bearings and motor are segregated from the pumped liquid, with a small line from the pump discharge to the motor cavity. The line from the pump discharge to the motor cavity is used to fill the motor cavity upon installation and provides the novel function of increasing the pressure inside the motor cavity and the boiling temperature of the fluid further increasing the heat dissipation to the surrounding air. Since the fluid is not circulated through the motor, particles do not enter the motor bearings.

BRIEF DESCRIPTION OF THE DRAWINGS

FIG. 7 is a partial section of a further embodiment of the invention.

DESCRIPTION OF THE PREFERRED EMBODIMENT

Figure 1:
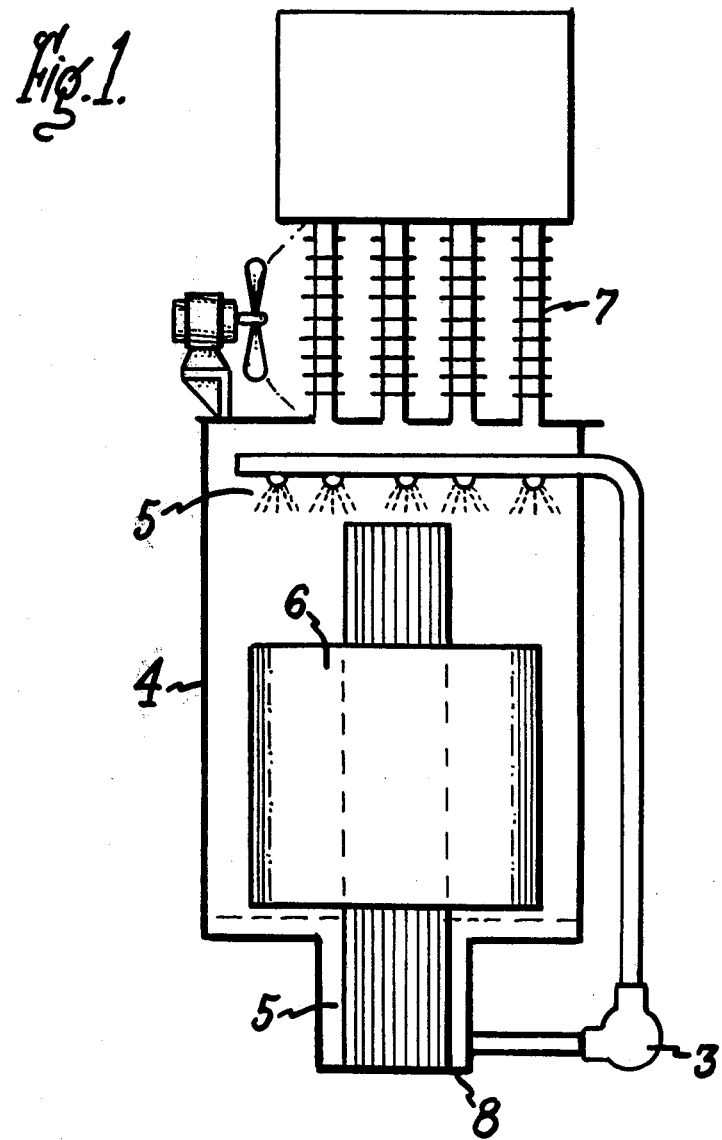
FIG. 1 is a front view in partial section of a transformer assembly of the type used with a circulating pump.
Figure 2:
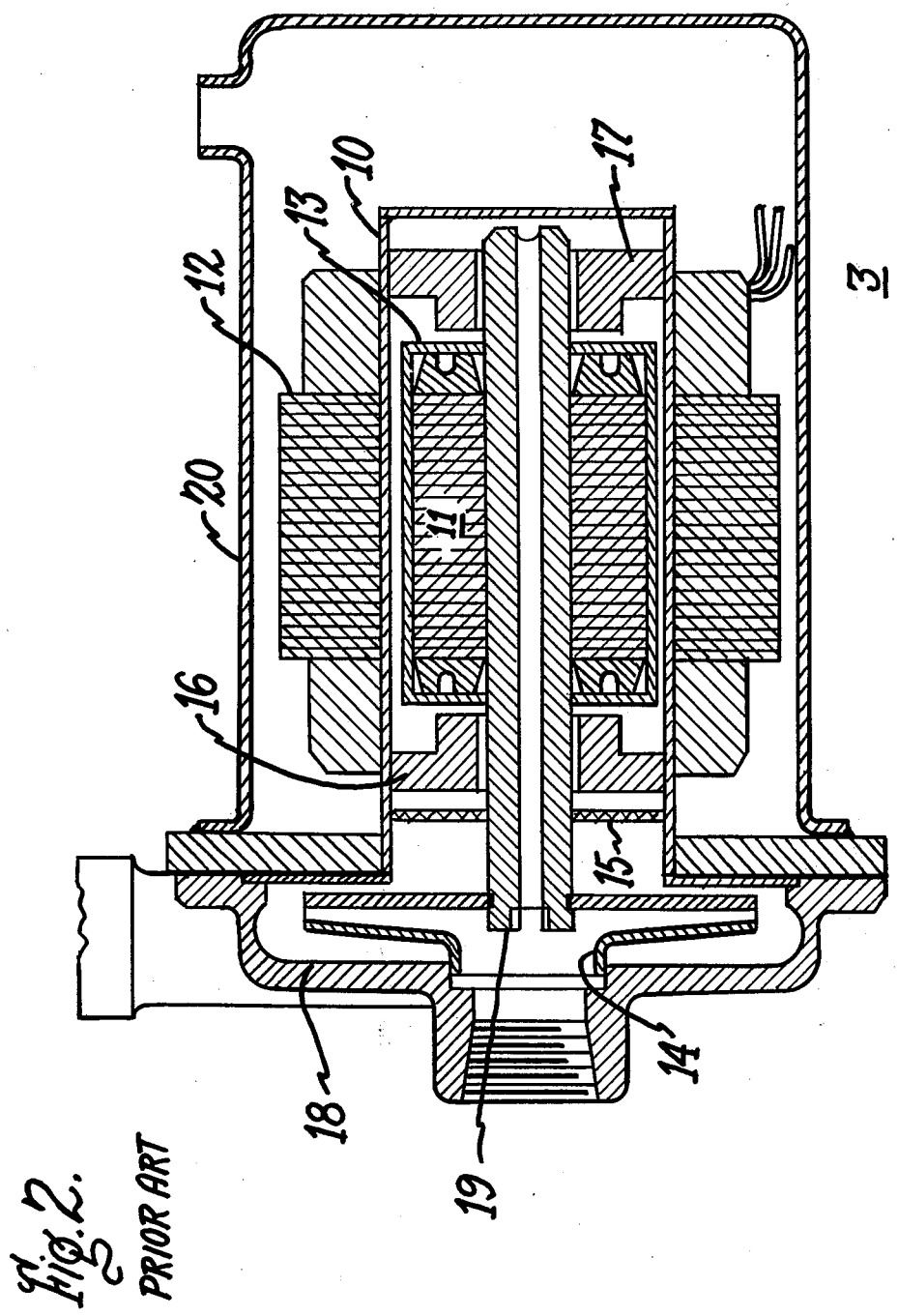
FIG. 2 is a sectional view of one prior art pump.
Figure 3:
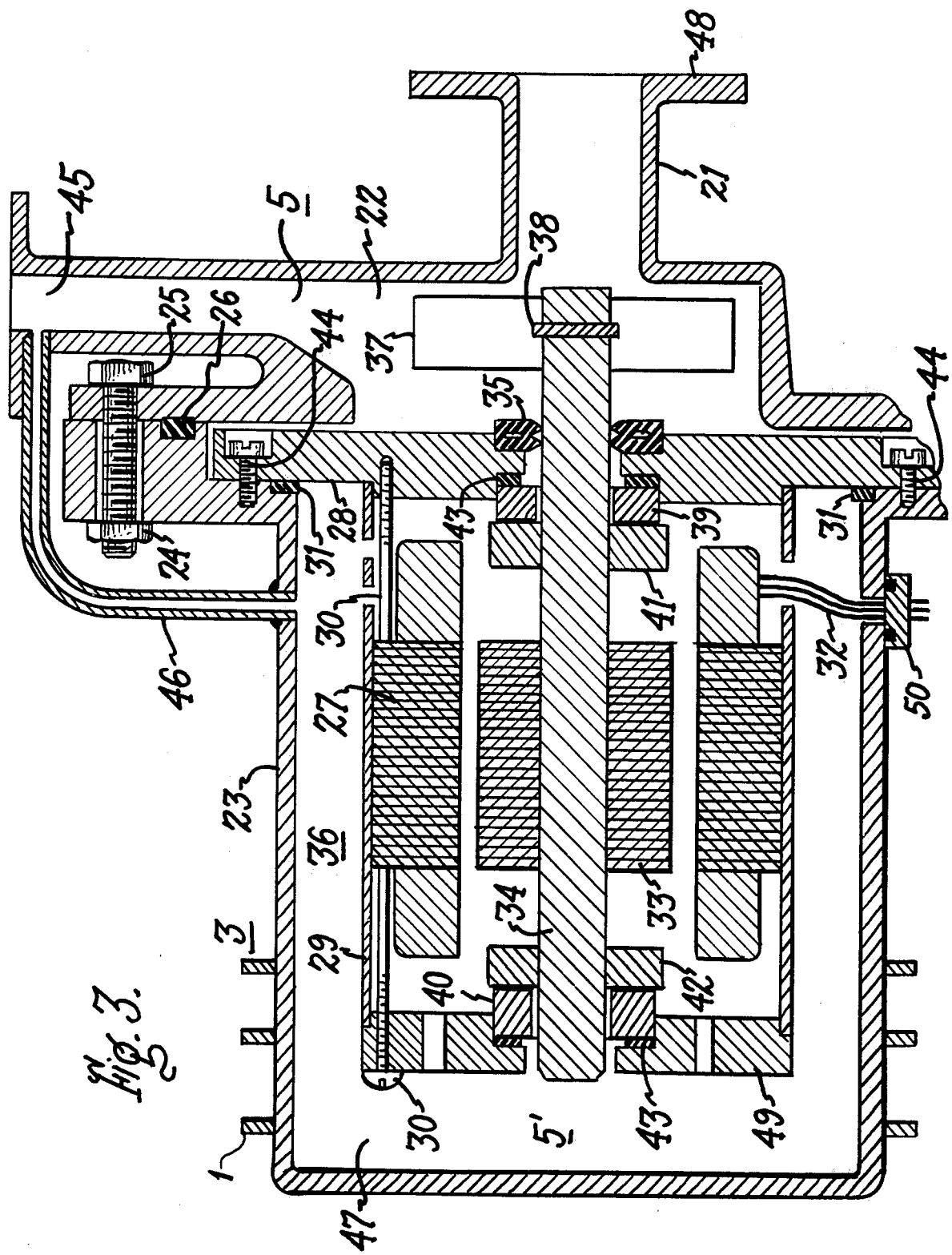
FIG. 3 is a sectional view of one embodiment of the invention.

FIG. 3 shows the novel pump 3 wherein an impeller housing 21 is provided with a scroll 22 of a well-known type. The impeller housing 21 is attached to a motor housing 23 by a plurality of bolts 25 and nuts 24. The pumped fluid 5 is prevented from leakage to the atmosphere by a static gasket 26 which is compressed by tightening of bolts 25 and nuts 24. An electric motor 36 is provided consisting of stator 27, rotor 33, mounting plate 28, shell 29, a plurality of screws 30, front bearing 39, rear bearing 40, spring washers 43, end bell 49, front thrust collar 41, rear thrust collar 42, and shaft 34. The stator is pressed into shell 29 and attached to mounting plate 28 by means of screws 30. A static gasket 31 prevents particles in fluid 5 from entering the motor housing 23 via gaps between mounting plate 28 and motor housing 23 which result due to surface imperfections. Mounting plate 28 is secured to motor housing 23 by means of screws 44.

The rotor 33 is pressed onto shaft 34 which protrudes through the mounting plate 28 into the fluid space of impeller housing 21. A seal 35 is pressed into mounting plate 28 and prevents the entrance of particles into the fluid space of motor housing 23. An impeller 37 of a well-known type is attached to shaft 34 with a pin 38 or by other suitable means.

A front bearing 39 is pressed loosely into mounting plate 28, and a rear bearing 40 is pressed loosely into end bell 49. A polished front thrust collar 41 and a rear thrust collar 42 are attached to shaft 34 at locations which maintain the proper location of rotor 33 relative to stator 27 and impeller 37 relative to scroll 22. The bearings 39,40 and thrust collars 41,42 carry the thrust loads transmitted to the shaft 34 by the electromagnetic forces on the rotor 33 and the hydraulic forces from the impeller 37. Spring washers 43 also serve to compensate for manufacturing variations in assembly and correctly position rotor 33 relative to stator 27. Thrust collars 41,42 may be omitted and the rotor 33 extended to contact the bearings 39,40. The rotor ends would then be polished.

The stator winding leads 32 exit through a hole in shell 29 and are joined to an electrical feed through 50 of a type commonly used on gas-tight refrigeration compressors.

End bell 49 and shell 29 contain a plurality of holes to allow the fluid 5' to contact the stator 27 and rotor 33.

The shaft 34 protrudes through a clearance hole in end bell 49. Motor housing 23 is constructed to be gas tight. An aluminum casting containing fins 1 may be used for dissipating the heat of the motor 36 from the fluid 5' to the air. The use of fins also increases the structural rigidity of the motor housing 23. Fins may also be attached to the motor housing by welding or other suitable means.

The motor housing 23 is connected to the discharge port 45 of impeller housing 21 with a hollow conduit 46. Conduit 46 is attached to discharge port 45 and motor housing 23 by a leak-tight means such as welding, brazing, flared tube fittings or other suitable leak-tight means. The conduit 46 is used for initial filling of motor housing 23 with fluid 5' from the fluid space of impeller housing 21. During operation of the pump, there is no circulation of fluid 5 through conduit 46 so that a conduit considerably smaller than discharge port 45 may be used. Motor housing 23 is larger than shell 29 so that a bulk fluid space 47 is defined around shell 29. The stator may be pressed into the motor housing 23 provided channels are placed in the stator and/or space is maintained at the end of the stator to permit fluid circulation. Since there is no forced circulation of the fluid 5' through the motor 36, the conduit 46 may be smaller than discharge port 45 and any particles which enter the motor housing 23 through conduit 46 settle to the bottom of the bulk fluid space 47. An important feature of this invention is the absence of the prior art return path for the cooling fluid 5' into the impeller housing 21 which would cause particles to be forced into the motor.

The operation of the pump is as follows. Application of electrical power to the stator 27 causes the rotor 33 to revolve, driving the impeller 37 which causes fluid 5 to be drawn into suction port 48 of impeller housing 21 at a pressure lower than the pressure in the transformer sump 8. The fluid 5 is pumped by the impeller 37 through discharge port 45 of the scroll 22, increasing the pressure above that within the transformer tank 4. Since the conduit 46 connects discharge port 45 with motor housing 23, the pressure in the fluid space 47 is increased above the pressure in the main transformer tank 4 to a value equal to the pump discharge pressure.

Heat transfer from motor 36 is as follows. The motor housing 23 is totally filled with fluid 5' so that the heat from the motor 36 is transferred to the fluid 5' by boiling (vaporization). The boiling temperature is controlled by the pressure in the motor housing due to the conduit 46 connected to the discharge port 45. The boiling temperature is below the maximum permissible operating temperature of the motor 36. The vapor bubbles due to boiling rise from the heated motor 36 and condense when they contact the bulk fluid 5' surrounding the stator shell 29. The bulk liquid 5' has been cooled a few degrees centigrade below the boiling temperature by contact with motor housing 23 which may contain fins to dissipate the heat to the surrounding air by convection. Since the pressure in the motor housing 23 has been elevated to a value higher than the main transformer tank 4, the boiling temperature of the fluid and thus the bulk fluid temperature has been increased above that which would exist if the fluid were circulating. The heat transfer to the surrounding air is thus increased due to the higher temperature difference. For example, consider a pump using trichlorotrifluoroethane (Refrigerant 113). With fluid circulation, if the transformer pressure is 12 psig=26.7 psia, the boiling temperature corresponding to this pressure is 67° C. In a 40° C. ambient, the temperature difference is 27° C.

With the arrangement of the invention, the increase in pressure due to the pump discharge is about 20 psi. The total pressure in the pump motor housing is 46.7 psia, the boiling temperature of R-113 at this pressure is 88° C., therefore the temperature difference is increased to 48° C. This means that the heat dissipation to the surrounding air is increased by 78 percent so that less surface area in the form of fins on the motor housing is required.

The boiling heat transfer mode of heat removal from the windings to the fluid is well known to be more efficient than forced circulation (convection) single phase heat transfer. That is, the temperature rise of the motor windings over the fluid temperate is less with the boiling heat transfer.

The conduit 46 also serves to vent any noncondensible gases released during boiling into the main fluid lines where they are carried to the expansion space of the transformer. The conduit 46 also allows for thermal expansion of the fluid in the motor housing 23 to prevent destructive pressure build-up. The conduit 46 also serves to replace any fluid 5' lost by seepage of vapor through seal 35 into impeller housing 21. Without the conduit 46 the motor housing 23 could boil dry if seal 35 leaks.

Vaporizable dielectric fluids such as trichlorotrifluoroethane are usually poor lubricants, so that bearings, 16,17 may be constructed of a self-lubricating material such as teflon. A suitable material is DuPont Aramid compound KS-305 containing 12% teflon since the wear products of these materials thus will not contaminate the fluid 5 to cause electrical failure of the pump motor or transformer. Prior art pumps use graphite which is a possible contaminant.

The function of the seal 35 in the mounting plate 28 is to prevent the entrance of particles into the motor housing 23. Since the same fluid is contained within the impeller housing 21 and the motor housing 23, small leakage of fluid is of no consequence. Since the pressure within the motor housing 23 is larger than the pressure within the impeller housing 21, the seepage of fluid will carry particles away from the bearings 39,40. The fluid seepage is replaced by fluid entering from conduit 46.

Seal 35 may be constructed of polytetrafluoroethylene, Buna N rubber, Viton, or any material compatible with the fluid 5. Seal 35 is a single or double lip seal of a well-known type, and is pressed into the mounting plate 28. The seal 35 is sometimes constructed with a spring.

Since there is no forced circulation of the pumped fluid 5 into the motor housing 23, the output flow will be maximized for the impeller 37 and motor 36 combination used.

In addition, the clearance between the impeller 37 and the scroll 22 is larger than the clearance between the rotor 33 and stator 27 so that if bearing wear does occur there will be no rubbing of the impeller 37 against the scroll 22 to produce metallic particles which can lead to transformer failure.

In addition, since there is no stainless steel shell in the gap between the rotor 33 and stator 27 as in "canned rotor" designs, greater bearing wear is permissible and electrical losses are reduced due to the absence of the steel in the magnetic gap between the rotor 33 and stator 27. The electrical losses are further reduced due to the lower winding temperatures resulting from the improved heat transfer from the motor windings.

In addition, the dielectric fluid in the motor housing 23 imparts higher electrical strength to the motor electrical parts than in pump designs with the stator 33 exposed to air.

Figure 4:
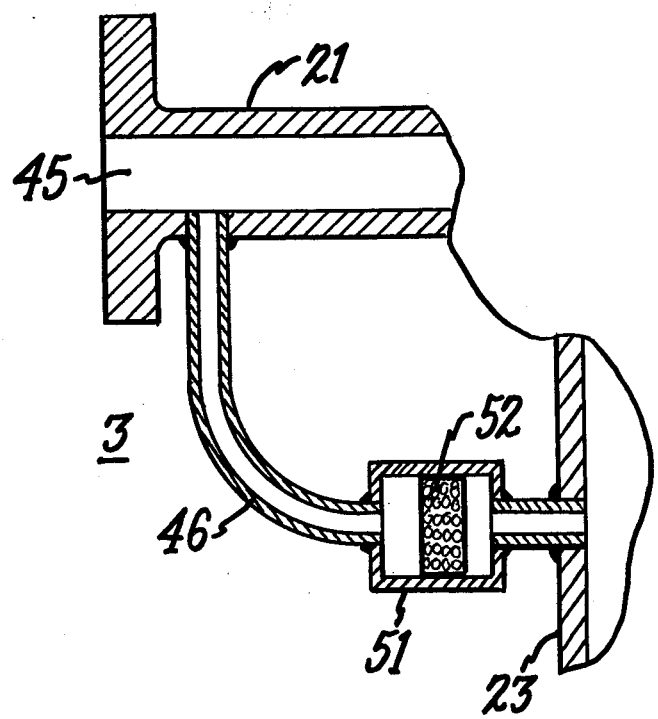
FIG. 4 is a partial section of an another embodiment of the invention.

FIG. 4 shows a further embodiment of pump 3 wherein a filter 51 of small size such as 7 microns is inserted in the conduit 46 to insure that no particles enter the motor housing 23 during filling. The filter material may consist of a desiccant 52 to absorb water or other contaminants released by the insulation in the motor 36 due to thermal degradation. The desiccant 52 serves to filter particles in the conduit 46 during filling of motor housing 23. The desiccant 52 also prevents acids or other decomposition products from failure of motor 36 from entering the fluid 5 which is pumped to cool the transformer. Suitable desiccant materials are zeolites, silica gel, and activated alumina, which are selected based upon the type fluid 5 used.

Figure 5:
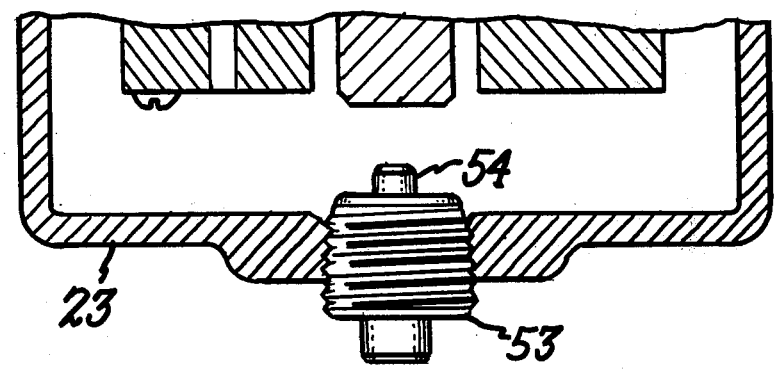
FIG. 5 is a partial section of a further embodiment of the invention.

FIG. 5 shows another embodiment of pump 3 wherein a plug 53 containing a magnetic material 54 is attached to the motor housing 23. The magnetic material 54 attracts any steel particles in the fluid 5'. With the use of the magnetic material 54 the bearings 39,40 can be changed to ball bearings if properly sized and the magnetic material 54 will attract any steel wear particles from the bearings 39,40.

In a field trial life test of a vaporization cooled transformer, pumps of the prior art failed after 16 weeks continuous operation due to particles in the fluid. A pump constructed according to the invention operated 40 weeks without failure.

Figure 6:
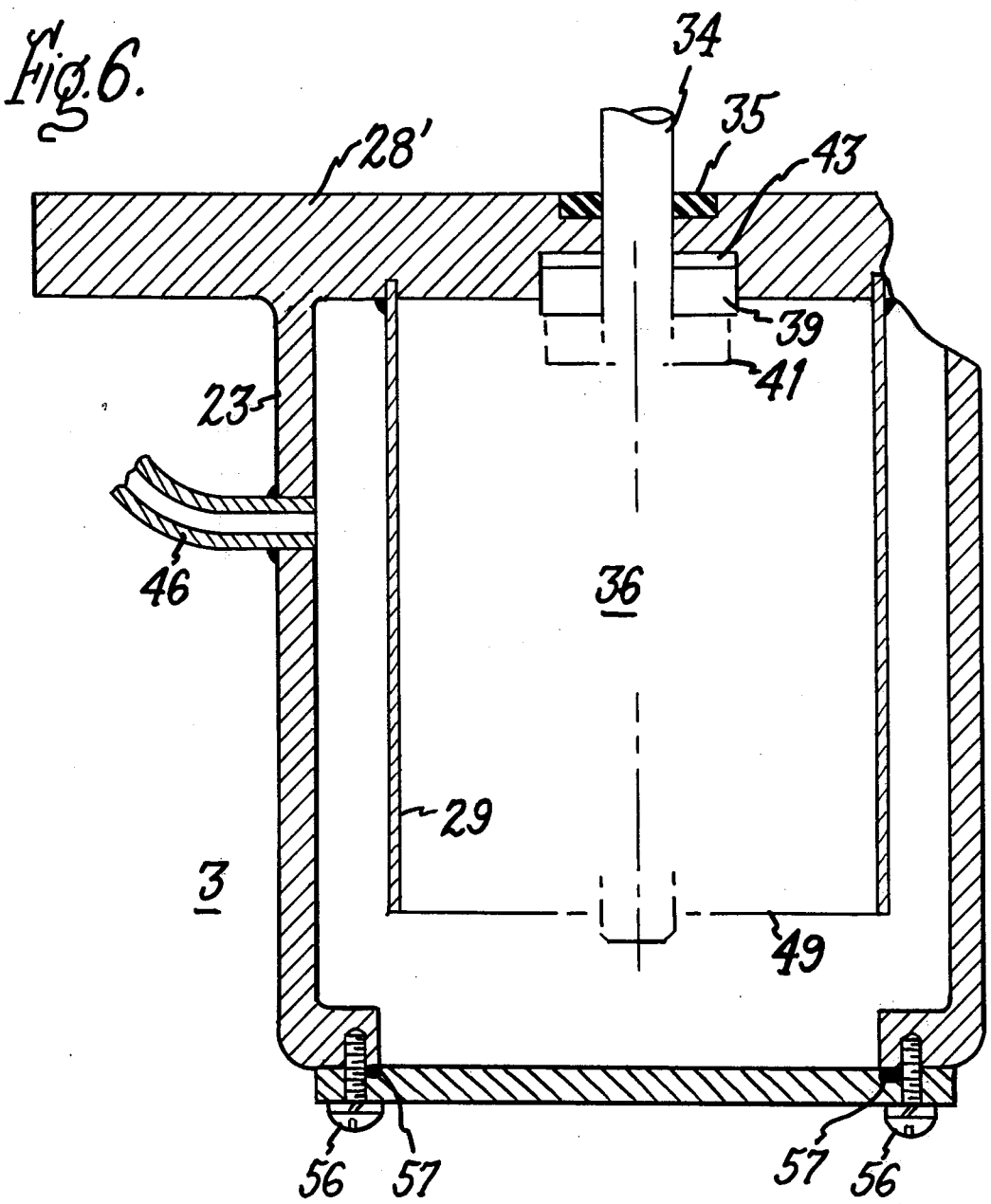
FIG. 6 is a partial section of an additional embodiment of the invention.

FIG. 6 shows an alternate embodiment of the invention wherein the motor mounting plate 28' is an integral part of the motor housing 23 and a second end bell 55 is attached to the motor housing 23 with screws 56 and sealed with a gasket 57. The second end bell 58 allows machining of the mounting plate 28' during manufacture and also permits installation and removal of the motor 36.

FIG. 7 shows another embodiment of the invention. The first end bell 49 of FIG. 6 has been eliminated and the rear bearing 40 and spring washer 43 are mounted in the second end bell 58.

In FIGS. 6 and 7 the stator may also be pressed into the motor housing 23 provided channels are placed in the stator and/or space is maintained at the ends of the stator to permit fluid circulation. Thrust collars 41,42 may likewise be omitted and the rotor 33 extended to contact the bearings 39,40. The rotor ends would be polished.

It should be understood that additional devices such as pressure relief valves, pressure gages, heat exchangers, drain valves, etc. may be added to my invention without deviation from the scope thereof. It should be understood that the invention may be applied to equipment other than vaporization cooled transformers provided the fluid pumped is a dielectric fluid. The fluid pumped need not be vaporizable if sufficient cooling surface is provided on the motor housing and if a sufficient size motor 36 is used so that the motor can be cooled by thermosyphon flow of the fluid within the motor housing. The dielectric fluid may be any fluid which is adequate for insulation of the motor stator windings and need not be a fluid commonly used as a dielectric in electrical apparatus. For example, carbon tetrachloride or liquid carbon dioxide would be suitable, whereas liquid mercury would not be a suitable fluid for this pump invention.

I claim:

1. A hermetically sealed motor driven pump for vapor cooled transformers comprising:
   a motor housing containing an electric motor and a dielectric fluid for cooling the motor;
   an impeller housing connected with the motor housing having an intake port, scroll, and discharge port and containing an impeller coupled with the motor by means of a shaft;
   sealing means between the impeller housing and the motor housing to prevent fluid transfer between the impeller housing and the motor housing;
   a conduit intermediate the discharge port and the motor housing for providing pressure within the motor housing:
   a stator secured to a mounting plate and an end bell secured to the stator;
   a front bearing retained in the mounting plate and a rear bearing retained in the end bell;
   a shaft for connection within the motor and attached to the impeller at one end;
   a rotor attached to the shaft within the motor stator to define an annular gap between the rotor and stator for rotation of the rotor; and
   thrust surfaces attached to the shaft to contact the bearings and for maintaining orientation of the rotor relative to the stator and the impeller relative to the scroll.

2. The pump of claim 1 wherein the motor housing is larger than the motor stator for circulation of the coolant fluid within the motor housing.

3. The pump of claim 1 wherein the thrust surfaces are an integral part of the rotor.

4. The pump of claim 1 including spring washers in the mounting plate and the end bell to maintain contact between the thrust surfaces and the bearings to compensate for wear.

5. The pump of claim 1 wherein the bearings are constructed of self-lubricated material.

6. The pump of claim 5 wherein the self-lubricating material comprises polytetrafluoroethylene.

7. The pump of claim 1 wherein the bearings are ball bearings.

8. A hermetically sealed motor driven pump for vapor cooled transformers comprising:
   a motor housing containing an electric motor and a dielectric fluid for cooling the motor;
   an impeller housing connected with the motor housing having an intake port, scroll, and discharge port and containing an impeller coupled with the motor by means of a shaft;
   sealing means between the impeller housing and the motor housing to prevent fluid transfer between the impeller housing and the motor housing;
   a conduit intermediate the discharge port and the motor housing for providing pressure within the motor housing;
   a stator secured to a mounting plate integrally formed with the motor housing;
   a first end bell secured to the stator for supporting the stator at one end;
   a front bearing retained in the mounting plate and a rear bearing retained in the first end bell;
   a shaft;
   a rotor attached to the shaft within the stator to define an annular gap between the rotor and the stator for rotation of the rotor;
   thrust surfaces attached to the shaft for providing contact with the bearings to maintain correct orientation of the rotor relative to the stator and the impeller relative to the scroll; and
   a second end bell mounted or the motor housing to provide means for insertion and removal of the motor.

9. The pump of claim 8 wherein the motor housing is larger than the motor stator for circulation of the coolant fluid within the motor housing.

10. The pump of claim 8 wherein the thrust surfaces are integrally formed with the rotor.

11. The pump of claim 8 including spring washers in the mounting plate and first end bell to maintain contact between the thrust surfaces and the bearings to compensate for wear.

12. The pump of claim 8 wherein the bearings are constructed of a self-lubricating material.

13. The pump of claim 12 wherein the self-lubricating material comprising polytetrafluoroethylene.

14. The pump of claim 8 wherein the bearings are ball bearings.

15. A hermetically sealed motor driven pump for vapor cooled transformers comprising:
   a motor housing containing an electric motor and a dielectric fluid for cooling the motor;
   an impeller housing connected with the motor housing having an imtake port, scroll, and discharge port and containing an impeller coupled with the motor by means of a shaft;
   sealing means between the impeller housing and the motor housing to prevent fluid transfer between the impeller housing and the motor housing;
   a conduit intermediate the discharge port and the motor housing for providing pressure within the motor housing;
   a stator secured to a mounting plate integrally housed with the motor housing;
   an end bell mounted on the motor housing to provide access for inserting and removing the motor;
   a front bearing retained in the mounting plate and a rear bearing retained in the end bell;
   a shaft concentrically arranged within the motor for providing connection between the motor and the impeller;
   a rotor attached to the shaft within the stator to define an annular gap for rotation of the rotor; and
   thrust surfaces attached to the shaft for maintaining the orientation of the rotor relative to the stator and the impeller relative to the scroll.

16. The pump of claim 15 wherein the motor housing is larger than the motor stator to permit circulation of the coolant fluid within the motor housing.

17. The pump of claim 15 wherein the thrust surfaces are integrally formed wuth the rotor.

18. The pump of claim 15 including spring washers in the mounting plate and the end bell for maintaining contact between the thrust surfaces and the bearings to compensate for wear.

19. The pump of claim 15 wherein the bearings are constructed of self-lubricating material.

20. The pump of claim 19 wherein the self-lubricating material comprises polytetrafluoroethylene.

21. The pump of claim 15 wherein the bearings are ball bearings.

* * * * *